April 23, 1968 S. W. CRISPE ET AL 3,379,140

WAFER FEED DEVICE

Filed March 18, 1966 2 Sheets-Sheet 1

INVENTORS:
STANLEY W. CRISPE
MICHAEL J. MERCER
BY
Browne, Schuyler & Beveridge
ATTORNEYS INVENTORS:
STANLEY W. CRISPE
MICHAEL J. MERCER
BY
Browne, Schuyler & Beveridge
ATTORNEYS United States Patent Office 3,379,140
Patented Apr. 23, 1968

3,379,140
WAFER FEED DEVICE

Stanley William Crispe, Liverpool, and Michael John Mercer, Newton-le-Willows, England, assignors to T. & T. Vicars Limited, Newton-le-Willows, Lancashire, England, a British company Filed Mar. 18, 1966, Ser. No. 535,553
Claims priority, application Great Britain, May 13, 1965, 20,165/65
6 Claims. (Cl. 107—1)

Figure 1:
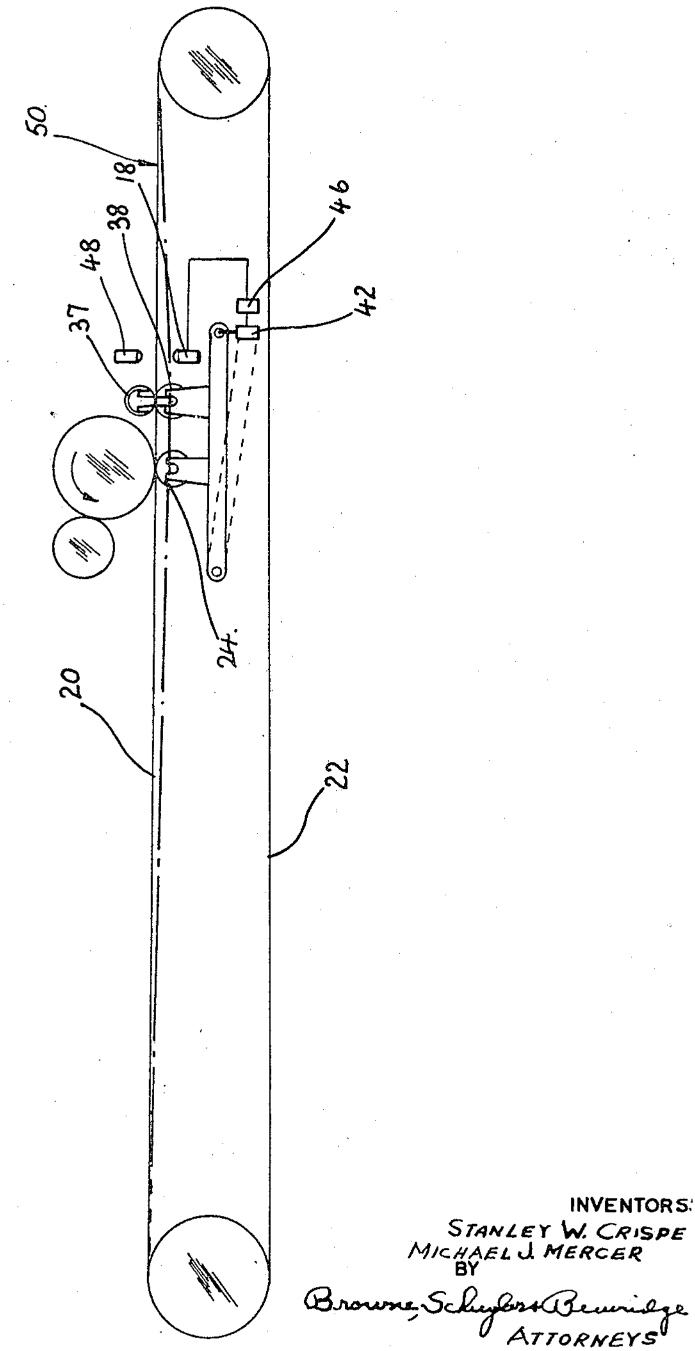

The present invention relates to a device for selectively feeding wafers to a coating position and may be used in combination with an arrangement for coating wafers by the contact method.

In building up a wafer sandwich biscuit, individual wafers are fed beneath an arrangement for coating or spreading cream, jam or other filling thereon, and a number of these coated wafers are then laminated to form a partially completed sandwich having filling on the upper surface of the uppermost wafer. A plain, i.e. uncoated wafer is then placed in position on top of the partially completed sandwich to form a completed wafer sandwich biscuit. It has previously been proposed that a portion of the continuous stream of wafers issuing from a wafer-former machine or magazine should by-pass the coating or spreading arrangement and laminating portion of the assembly, these wafers being eventually employed as plain top wafers. The drawback of this type of assembly has been the difficulty in mechanically synchronising the operation so that the required number of wafers bypass the spreading and laminating portion of the assembly e.g. one wafer in four must by-pass the spreading and laminating assembly for a four wafer sandwich.

The contact method of coating wafers involves the use of a depositing roller which deposits a coating, e.g. cream or jam, on the wafer when the wafer and roller come into contact. This method has the advantage that cream is only deposited when a wafer is in position. If for any reason there is a break in the line of wafers, cream is not deposited on the conveyor means carrying the wafers as happens in the ribbon coating method where a continuous ribbon of cream is employed.

According to the present invention a wafer feed device for selectively feeding wafers to a contact coating position comprises a wafer receiving station, conveyor means for carrying a supply of wafers from said receiving station past said coating position, deflector means operable at said receiving station to selectively deflect said conveyor means between a position in which a wafer carried thereby passes through said coating position for coating and a position in which a further wafer carried by the said conveyor is retracted away from said coating position so as to be led past said position without being coated, wafer sensing means capable of detecting the presence of a wafer at said receiving station and counting means associated with the said sensing means, said deflector means being operable in response to a signal from said counting means resulting from the passage of a predetermined number of wafers through said receiving station.

Preferably the deflector device is operable to raise and lower the conveyor means at said receiving station, the conveyor means preferably being in an undistorted condition in its uppermost position and being lowered to, and raised from, a distorted position in which a wafer carried thereby by-passes said coating position.

The wafer sensing means may conveniently take the form of a source of radiant energy and a radiant energy sensitive device mounted so that a wafer arriving at the wafer receiving station will break the beam of radiant energy. Preferably a light source and photo-electric cell is used.

The counting means may be an electronic counting device and may be adjusted to provide a signal to the deflector device after the passage of any pre-determined number of wafers through the receiving station.

The present invention also includes a wafer feed device as described above in combination with a contact coating arrangement, e.g. a contact creamer.

Figure 2:
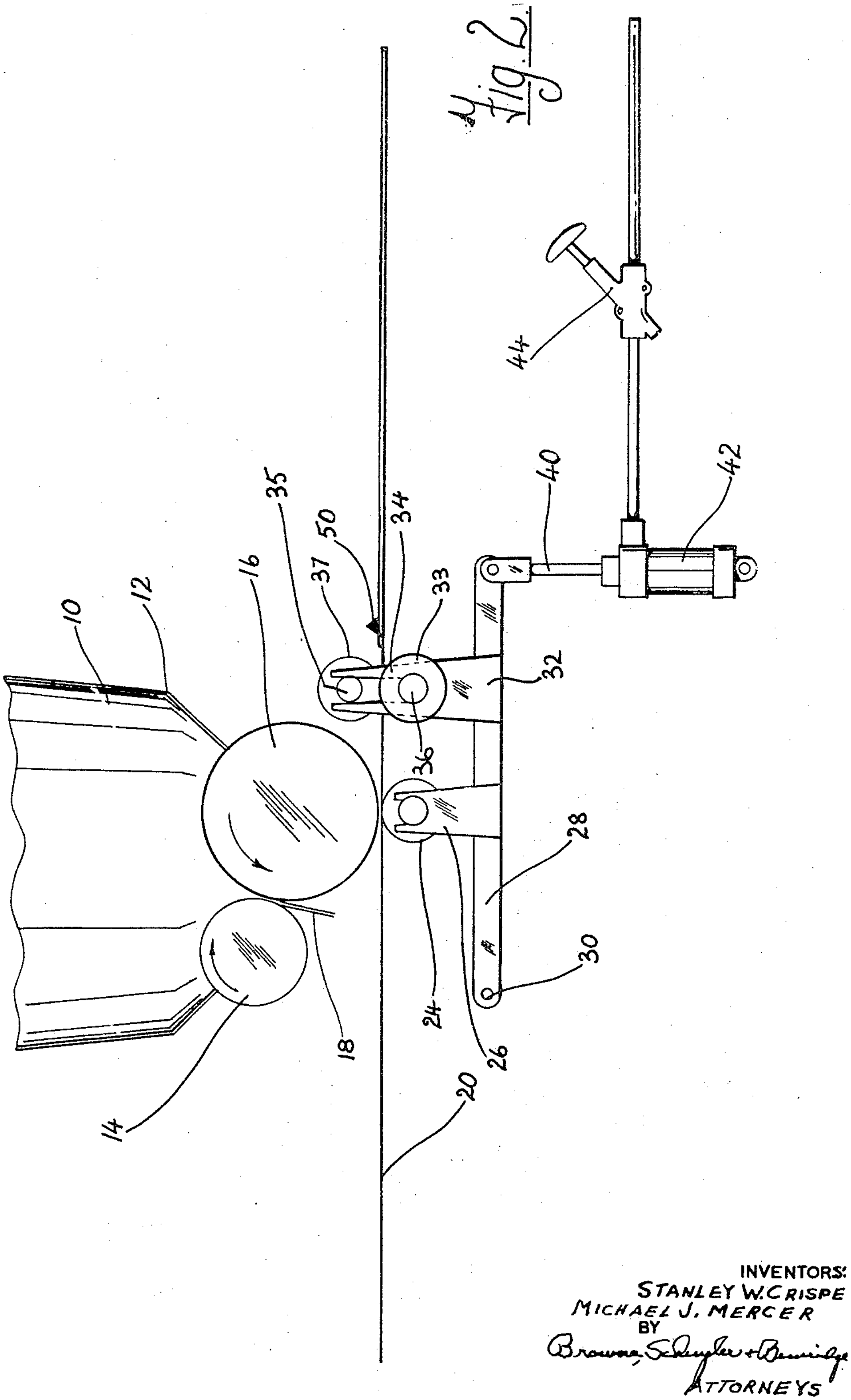

The present invention will now be described by way of example with reference to the accompanying drawings in which FIG. 1 is a purely diagrammatic side elevation of a general lay-out of a wafer creaming or coating assembly embodying one form of the invention, and FIG. 2 is an enlarged detail of the deflector mechanism shown in FIG. 1.

Referring to the drawings a contact creamer comprises a reservoir 10 containing cream 12, a transfer roller 14, a depositing roller 16, and a transfer scraper 18. Upper pass 20 of conveyor 22 when in undistorted condition, as shown by the full lines on FIG. 1 carries a supply of wafers beneath and into contact with the depositing roller 16. A roller 24 is positioned beneath the upper pass 20 of the conveyor 22 to support the conveyor and the wafer during creaming. The roller 24 is rotatably mounted in a pair of support members 26 which are in turn mounted on a pair of beams 28 pivoted at one end about point 30. A second pair of support members 32 are mounted one on each beam 28 on the side of the support members 26 remote from pivot point 30. Each support member 32 is provided with a slot 34 in which one end of axles 35, 36 of a pair of co-operating rollers 37 and 38 are rotatably mounted. The roller 38 is mounted beneath the upper pass 20 of the conveyor 22 and the roller 37, which is a solid rubber coated roller, is mounted above the upper pass 20 of the conveyor 22 and presses the upper pass 20 onto the roller 38.

The opposite end of each beam 28 to the pivot point 30 is pivotably connected to extension 40 of the piston (not shown) of a hydropneumatic spring return cylinder 42. The spring return is biased to maintain the web in its undistorted condition, also allows for any slight difference in wafer thickness and together with the roller 37 provides a positive grip on the wafer. Exhaust from each cylinder 42 is controlled by an air flow regulator 44. The cylinders 42 are actuated simultaneously to raise and lower the associated extensions 40 in response to a signal from a counting device 46 associated with a wafer sensing device 48.

The operation of the assembly will be illustrated with reference to the production of a four wafer sandwich but it is to be appreciated that a sandwich having any number of wafers may be prepared merely by alteration of the frequency of signals from the counting device 46.

In operation wafers are fed from a wafer magazine, baking oven, wafer-forming machine or any other source thereof along the upper pass 20 of the conveyor 22 and are detected at wafer receiving station 50 by the wafer sensing device 48 and counted by the associated counting device 46. Three wafers are normally allowed to pass along the upper pass 20 and obtain a coating of cream thereon. The counting device is pre-set to send a signal to actuate the cylinders 42 on passage of every fourth wafer to lower their associated extensions 40 and thus beams 28. This causes the support members 26 and 32 to be lowered. The solid roller 37 positioned on the upper pass 20 of conveyor 22 thus presses the upper pass 20 of the conveyor 22 into a distorted position (as shown by the chain dotted line on FIGURE 1) thus causing any wafer now passing beneath depositing roller 16 to pass the roller 16 at some distance therefrom without contacting it and thus without being coated with cream. After passage of the fourth wafer the cylinder is exhausted through the flow control 44 which ensures that the rollers and the conveyor do not bounce and touch the depositing roller thus allowing the conveyor to return to its undistorted position, under the influence of the spring return. Three wafers are allowed to proceed normally along the upper pass of conveyor 20 in the position shown in FIG. 2 and thus obtain a coating of cream on the upper surface thereof before the fourth wafer is passed uncreamed. The wafers then pass to an arrangement (not shown) where they are stacked one upon another to form a four wafer sandwich.

It will be readily appreciated that many modifications may be made to the apparatus shown in the drawings for example the raising and lowering of the rollers 24, 37 and 38 and thus the upper pass 20 of the conveyor 22, may be operated by any convenient means and the raising and lowering mechanism may be operated through an adjustable electronic time delay according to the number of wafer sandwiches being built.

Another possible modification is the replacement of the hydropneumatic spring return cylinder by a double acting cylinder. In this modification a spring return cylinder link is inserted between the double acting cylinder and the connection to the beam 28.

We claim:

1. A wafer feed device comprising a wafer receiving station, wafer coating means, conveyor means arranged to carry a supply of wafers from said receiving station, past said coating means, said conveyor having a coating position and a non-coating position located adjacent said coating position, deflector means operable adjacent said coating means to selectively deflect said conveyor means between said coating position in which a wafer carried thereby passes adjacent said coating means for coating and said non-coating position in which a further wafer carried by said conveyor is retracted away from said coating means, so as to be led past said coating means without being coated, wafer sensing means capable of detecting the presence of a wafer at said receiving station and counting means associated with the said sensing means, said reflector means being operable in response to a signal from said counting means resulting from the passage of a predetermined number of wafers through said receiving station.

2. A wafer feed device according to claim 1, wherein said deflector means is operable to raise and lower the conveyor means at said receiving station.

3. A wafer feed device according to claim 2, wherein said conveyor means is in an undistorted condition in its uppermost position and may be lowered to, and raised from, a distorted position in which a wafer carried thereby bypasses said coating position.

4. A wafer feed device according to claim 1, wherein said wafer sensing means comprises a source of radiant energy and a radiant energy-sensitive device mounted so that a wafer arriving at said wafer receiving station will break the beam of radiant energy.

5. A wafer feed device according to claim 4, wherein said wafer sensing means comprises a light source and a photo-electric cell.

6. A wafer feed device according to claim 1, wherein said counting means comprises an electronic counting device, which is adjusted to provide a signal to the deflector means after the passage of a predetermined number of wafers through the receiving station.

References Cited

UNITED STATES PATENTS

| | | | |
|---|---|---|---|
| 2,657,646 | 11/1953 | Derbyshire et al. | 107—1 |
| 2,817,306 | 12/1957 | Oakes | 107—1 |
| 3,119,352 | 1/1964 | Fay | 107—1 |
| 3,277,846 | 10/1966 | Kesselman | 107—1 |

WALTER A. SCHEEL, *Primary Examiner.*

A. O. HENDERSON, *Assistant Examiner.*